Dec. 8, 1925.　　　　　　　　　　　　　　　　1,564,898
E. C. SASNETT
AUTOMATIC VEHICLE CONTROLLING SYSTEM
Filed April 10, 1923
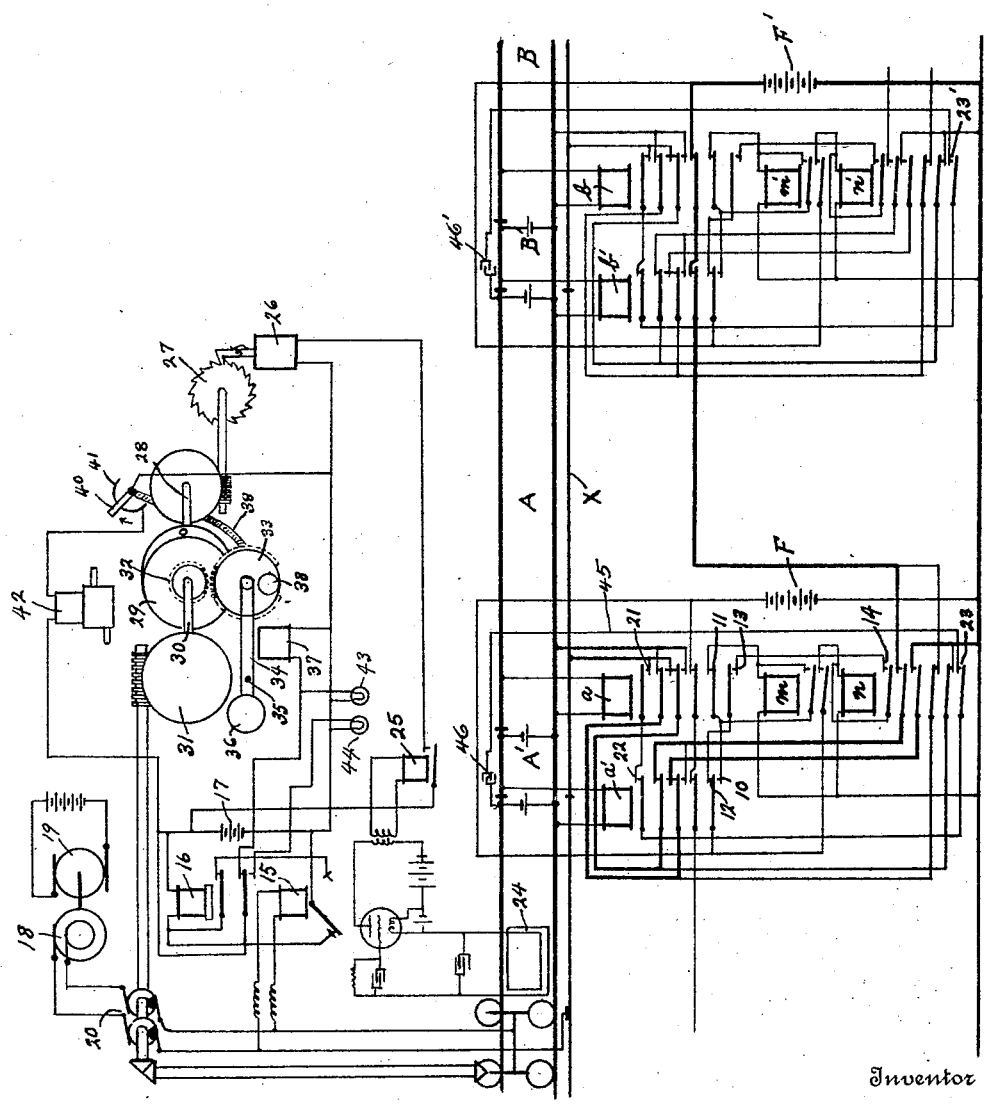
Inventor
Edward C. Sasnett Patented Dec. 8, 1925.

1,564,898

UNITED STATES PATENT OFFICE.

EDWARD C. SASNETT, OF WASHINGTON, DISTRICT OF COLUMBIA.

AUTOMATIC VEHICLE-CONTROLLING SYSTEM.

Application filed April 10, 1923. Serial No. 631,115.

*To all whom it may concern:*

Be it known that I, EDWARD C. SASNETT, a citizen of the United States, and a resident of Washington, in the District of Columbia, have invented certain new and useful Improvements in Automatic Vehicle-Controlling Systems, of which the following is a specification.

The present invention relates to railway signalling and particularly to automatic train controlling systems of the continuous indication type.

The object of this invention is to produce an automatic train controlling system based on correct principles. A further object of the invention is to produce a system of this character by means of which a train may receive an indication not only of the static condition of the track ahead but also of the movement of any rolling stock thereon.

I will explain the specific nature and objects of the invention by reference to the accompanying drawings, which illustrate in a diagrammatic way one practical embodiment of the invention.

The drawing shows a track divided into blocks, each of which consists of a preliminary section A′, B′ etc. and a main section A, B etc. Each section is provided with a track battery and a track relay $a'$, $b'$, $a$, $b$ etc. A conductor or third rail X is supported in any approved manner parallel to the track rails, and is divided into blocks corresponding to the track blocks. The track system also includes wayside relays $m$, $n$, $m'$, $n'$ etc. and sources of signalling current F, F′ etc. In the system illustrated the signalling current is direct and the sources are shown as batteries. These batteries are adapted to be connected across the track and third rail sections X through contacts operated by the track relays and the wayside relays. The heavy lines represent the connections of the battery F′ to the track and third rail section X, when a train is in section A and traffic conditions are clear. These connections are clear. These connections are formed in the following manner: When the train assumed to be in section A entered the preliminary section A′, with main section A clear, relay $a'$ dropped its contacts and closed a pick up circuit for relay $m$, from battery F, back contact 10 and front contact 11. Relay $m$ picked up and closed a holding circuit for itself through its own front contact and through back contact 10, and as this holding circuit is exclusive of front contact 11, relay $m$ remained energized when the train entered section A and was deenergized only after the train entirely left section A′. When relay $m$ picked up it closed an energizing circuit for relay $n$, said circuit including battery F and a front contact of relay $m$. Relay $n$ therefore picked up when the train entered section A′ and was held energized after relay $m$ dropped, by reason of the train passing out of section A′, by means of the following stick circuit: battery F, front contact 12, back contact 13, front contact 14, relay $n$ and back to battery. It will be observed that normally, that is when sections A′, A, B′, B are clear, the battery F′ is connected to the third rail section X and track rail through front contacts of relays $b$, $b'$, back contacts of relay $n$, and front contacts of relay $a$. The heavy lines, which as before stated represent the connections of battery F′ with the third rail and track when a train occupies section A under clear conditions, connects said battery in the same sense, or direction, as the normal connections through the back contacts of relay $n$.

The vehicle equipment includes a shoe, or other suitable form of contact, travelling on third rail X and a polarized relay 15 connected on one side to the shoe and on the other side to the wheels of the vehicle. Relay 15, therefore, is adapted to be energized by current transmitted from the wayside batteries through the third rail and track. Polarized relay 15 when energized with current of one polarity, which may be called clear polarity, closes a pick-up circuit through a slow acting relay 16. The drawing represents relay 15 in the position it assumes when closing said pick-up circuit. When relay 15 is operated by reverse current it closes one gap in a stick circuit through relay 16, the other gap including a front contact of the latter. When relay 15 is shifting from one of its contacts to the opposite contact, relay 16 does not drop its contacts, as it is slow acting and the interval required to reverse the contacts of relay 15 is very brief, but when relay 15 is deenergized, relay 16 drops and cannot pick up again until its pick up circuit is closed by reason of relay 15 being energized with current of clear polarity.

The vehicle equipment also includes a generator 18 of alternating or oscillating energy which can not effectively energize relay 15. This generator is adapted to be driven at constant speed by a motor 19. The terminals or brushes of generator 18 are connected through a circuit interrupter 20 to the vehicle shoe and wheels respectively. The interrupter 20 is driven by suitable gearing from an undriven wheel of the vehicle, so that the potential of generator 18 is adapted to be impressed across the third rail and track at intervals more or less rapid as the speed of the vehicle is high or low. Each third rail section is adapted to be connected to the track rail of the block in rear thereof by a connection which includes back contact 21, front contact 22, and front contact 23, conductor 45 and condenser 46 whereby energy may be transmitted by a vehicle in one block through the track rails of the block in the rear. Each vehicle is equipped with suitable means for receiving energy from the track rails and translating same to suitable operating devices. The illustration shows for this purpose a coil 24 carried in advance of the front wheels of the vehicle and located in inductive relation to the track rails. The coil 24 is connected in a circuit which is tuned to the particular alternating energy employed, the said circuit including the filament and grid of an electron tube. The plate circuit of this tube includes a primary adapted to induce current in the circuit of a relay 25. Relay 25 controls a solenoid 26, which operates a ratchet wheel 27 geared to a shaft 28. Shaft 28 drives one member of a differential mechanism 29, the other operating member of the differential being driven by a shaft 30 which is fixed to a gear 31 driven by a wheel of the vehicle. The ring, or planetary member, of the differential has fixed thereto a gear 32, this gear being rotated, therefore, in proportion to the difference between the angular velocities of shafts 28 and 30. A mutilated gear 33 is adapted to engage and be driven by gear 32. Gear 33 is rotatably supported in the end of an arm 34 which is pivoted at 35 and is biased by a weight 36 to move gear 33 into engagement with gear 32. Under normal or clear conditions, however, the arm 34 is held down by a magnet 37, holding gear 33 out of engagement with gear 32. When gear 33 is thus held out of engagement it assumes a definite normal position by reason of a weight 38 attached thereto, or other suitable biasing means. Gear 33 is connected to a flexible shaft 39, which is connected to rotate an arm 40 over a contact segment 41. The circiut of a suitable brake controlling mechanism passes through this segment and through arm 40, whereby the brakes will be applied when arm 40 leaves segment 41.

The system above described operates in the following manner:—

The vehicle shown at the left is travelling under clear conditions, and the vehicle controlling mechanism is in normal condition, that is, gear 33 is held disengaged from gear 32 and the arm 40 engages the segment 41 centrally thereof, while the circuit of clear lamp 43 is closed and that of caution lamp 44 is open. As the progressing vehicle enters the preliminary section A′ the wayside relay $n$ picks up by reason of the connections heretofore described and maintains the clear polarity connections of battery F′ with the third rail section X and track, the polarized relay 15 remaining unaffected. When the vehicle enters section A and is partly in the latter and partly in section A′, the dropping of the contact of relay $a$ reverses the polarity of the current flowing through relay 15. This relay therefore shifts from the position shown on the drawing to the opposite position, but relay 16 does not drop its contacts during the brief instant its circuit is broken. When the vehicle entirely leaves section A′, the picking up of relay $a'$ reverses the current through relay 15 and the contact of relay 15 shifts back to clear position without disturbing relay 16. The shifting of the contact or relay 15, therefore, from one of its contacts to the opposite one and back again as the vehicle passes into a block under clear conditions does not affect the vehicle controlling mechanism.

Assume that when the vehicle enters section A′ another vehicle is in section B. Under these conditions, the relay $n$ would pick up as before, as it is controlled solely by the sections A′ and A, but the battery F′ is now cut off from the third rail section pertaining to section A by reason of the relay $b$ being open. The vehicle entering the block A′, A, therefore, would receive no signalling energy; its relays 15 would be deenergized, thus opening the circuit of relay 16, which, in turn, opens its own stick circuit as well as the circuit of magnet 37 and clear lamp 43 and closes the circuit of caution lamp 44. Magnet 37 thereupon releases arm 34, permitting gear 33 to engage gear 32 to drive gear 33 in accordance with the difference in the angular movements of shafts 28 and 30. The vehicle in section A now receives alternating energy from the vehicle in section B, the said energy being transmitted in impulses of substantial duration in accordance with the travel of the vehicle in section B. These impulses of alternating energy are translated to relay 25 by the amplifying device described and cause relay 25 to close and open the circuit of solenoid 26, the latter operating ratchet 27 to rotate shaft 28 in accordance with the movement of the vehicle in section B. The shaft 30 is continuously rotated proportionately to the travel of the vehicle under consideration, the result being that the arm 40 is rotated proportionately to the difference in the rates of travel of the two vehicles. The elements are so designed that if the vehicle in section A and the vehicle in section B are travelling at the same speed, shafts 28 and 30 will be rotated in opposite directions at the same angular velocity, hence causing no movement of gear 33 and arm 40; if the vehicle in section A is travelling faster than the vehicle in section B, arm 40 will be rotated in a clockwise direction in exact proportion to the difference in the rates of the two vehicles; and if the vehicle in section B is travelling faster than the vehicle in section A, arm 40 will be rotated in a counter-clockwise direction. The length of segment 41 is so designed that, assuming the vehicle in section B to be standing still, the arm 40 will leave segment 41 when the vehicle in section A arrives at a point therein where an application of the brakes will bring the vehicle to a standstill just before it reaches section B'. That is, the brakes will be applied within stopping distance of the hazard. The arm 40 may cooperate with suitable graduations to show the distance from a hazard.

It will be understood by those versed in this art that the arm 40 may be made to cooperate with a suitable device, such as a centrifugal governor to lower the permissive speed limit progressively as the vehicle approaches a hazard, or that the interruption of the brake circuit by arm 40 may be shunted by a governor when the speed of the vehicle has been reduced to a safe point.

If the vehicle in section A enters section B' before the vehicle in section B clears that section, assuming the block in advance of B to be clear, the dropping of relay b' would interrupt the holding circuit of relay n'; the latter would drop and reverse the clear polarity of the current flowing through the relay 15 of the vehicle in advance. The relay 15 of the advance vehicle, however, would shift from clear to reverse position without causing its relay 16 to drop and hence without affecting its controlling mechanism. The energization of relay 15 on the rear train with reverse polarity does not cause its relay 16 to pick up, for after relay 16 has once dropped its contacts, it cannot again pick up until relay 15 is energized with clear polarity. Hence the rear vehicle will be compelled to travel under control and cannot get a clear indication until it enters the preliminary section of a clear block. The entrance of the second vehicle in block B', B, by opening the front contact 23' of relay n', would also eliminate the possibility of energy being transmitted from either vehicle to the track rails of section A. It is of course necessary to cut out the transmission of alternating energy when two trains are in the same block, as there is no way at present known of differentiating between the two trains; and if the rear train were standing still, for instance, and the forward train were travelling and transmitting its alternating energy to the rails of section A, a train in the latter would receive a false indication.

I claim:

1. A continuous indication train controlling system, comprising a track divided into block sections, a closed track circuit for each section, a conductor parallel to the track divided into corresponding sections, means controlled by the track circuits for supplying signalling energy to said conductor sections in accordance with traffic conditions, a vehicle having a contact travelling on said conductor, an electro-responsive device connected to said contact, a source of energy on said vehicle of a different character from said signalling energy, means controlled by the track circuits for connecting each conductor section with a track rail of the block in rear thereof, whereby a vehicle travelling in a block may transmit energy through the track rails of the preceding block, a translating device on said vehicle responsive to energy transmitted through the track rails from a vehicle carried source, and train controlling devices governed jointly by said electro-responsive and translating devices.

2. In an automatic system for controlling railway vehicles, a track divided into block sections, a vehicle travelling on said track, a source of electrical energy carried by said vehicle, means for connecting said energy across the track rails of a preceding block, a translating device on said vehicle responsive to energy transmitted through the track rails, and vehicle controlling means actuated by said translating device.

3. In an automatic system for controlling railway vehicles, a track divided into block sections, a vehicle travelling on said track, a source of electrical energy carried by said vehicle, connections for transmitting said energy to the track rails of a preceding block, automatic means for preventing the transmission of energy to the track rails of a block when two or more vehicles occupy the block in advance thereof, a translating device on said vehicle responsive to energy transmitted through the track rails, and vehicle controlling means actuated by said translating device.

4. In an automatic system for controlling vehicles, a track divided into block sections, a hevicle travelling on said track, a source of electrical energy carried by said vehicle, connections for transmitting said energy to the track rails of a preceding block, said connections including a circuit interrupter opening and closing in accordance with the travel of the vehicle, a translating device on the vehicle responsive to energy transmitted through the track rails, a step-by-step mechanism operated by said translating device, and vehicle controlling means actuated by said step-by-step mechanism.

5. In an automatic system for controlling railway vehicles, a track divided into block sections, a vehicle travelling on said track, a source of electrical energy carried by said vehicle, connections for transmitting said energy to the track rails of a preceding block, said connections including a circuit interrupter opening and closing in accordance with the travel of the vehicle, automatic means preventing the transmission of energy when two or more vehicles occupy the same block, a translating device carried by the vehicle responsive to energy transmitted through the track rails, a step-by-step mechanism controlled by said translating device, and vehicle governing means actuated by said step-by-step mechanism.

6. In an automatic system for controlling railway vehicles, a track divided into block sections, a vehicle travelling on said track, a source of electrical energy carried by said vehicle, connections for transmitting said energy to the track rails of a preceding block, said connections including a circuit interrupter opening and closing in accordance with the travel of the vehicle, automatic means preventing the transmission of energy when two or more vehicles occupy the same block, a translating device responsive to energy transmitted through the track rails, a step-by-step mechanism operated by said translating device, a member on the vehicle operating proportionately to the travel thereof, and vehicle controlling means actuated jointly by said member and said step-by-step mechanism.

7. In an automatic system for controlling railway vehicles, a track divided into block sections, a vehicle travelling on said track, a source of electrical energy carried by said vehicle, means for transmitting said energy to the track rails of the preceding block in accordance with the travel of the vehicle, automatic means preventing the transmission of energy when two or more vehicles occupy the same block, a translating device carried by the vehicle responsive to energy transmitted through the track rails, and vehicle controlling means actuated by said translating device.

8. In an automatic system for controlling railway vehicles a track divided into block sections, a vehicle travelling on said track, a source of electrical energy carried by said vehicle, means for transmitting said energy to the track rails of a preceding block in impulses controlled by the travel of the vehicle, means for preventing the transmission of energy when two or more vehicles occupy the same block, a translating device carried by the vehicle responsive to energy transmitted through the track rails, and vehicle controlling means actuated by said translating device.

9. In an automatic system for controlling railway vehicles, a track divided into block sections, a vehicle travelling on said track, a source of electrical energy carried by said vehicle, a second vehicle travelling on said track, an electro-responsive device carried by said second vehicle, means for transmitting energy from said source to said electro-responsive device in impulses controlled by the travel of said first vehicle, means for preventing the transmission of energy when two or more vehicles occupy the same block, and vehicle controlling means actuated by said electro-responsive device.

10. In an automatic system for controlling railway vehicles, a track divided into block sections, a vehicle travelling on said track, a source of electrical energy carried by said vehicle, a second vehicle travelling on said track, an electro-responsive device carried by said second vehicle, means for transmitting energy from said source to said electro-responsive device in impulses controlled by the travel of said first vehicle, means for preventing the transmission of energy when the second vehicle enters the block occupied by the first vehicle, a member on said second vehicle responsive to the travel thereof, and vehicle governing means controlled jointly by said member and said electro-responsive device.

11. In an automatic system for controlling railway vehicles, a track divided into block sections, a conductor parallel to the track divided into corresponding sections, means for energizing said conductor sections in accordance with traffic conditions, a vehicle on said track, a source of electrical energy on said vehicle connected to said conductor, an electro-responsive device on said vehicle connected to said conductor and unresponsive to said source of electrical energy, means controlled by the vehicle for connecting a conductor section with a track rail of the preceding block, a translating device on said vehicle responsive to energy transmitted through the track rails, and vehicle controlling means governed jointly by said electro-responsive and translating devices.

12. A continuous indication train controlling system, comprising a track divided into block sections, a closed track circuit for each section, a conductor parallel to the track divided into corresponding sections, means controlled by the track circuits for supplying signalling energy to said conductor sections in accordance with traffic conditions, a vehicle having a contact travelling on said conductor, an electro-responsive device connected to said contact responsive to said signalling energy, a source of energy on said vehicle of a different character from said signalling energy, said electro-responsive device being unresponsive to energy from said source, means controlled by the track circuits for connecting each conductor section with a track rail of the preceding block, whereby a vehicle travelling in a block may transmit energy to the track rails of the preceding block, a translating device on the vehicle responsive to energy transmitted through the track rails from a vehicle carried source, train controlling devices governed jointly by said electro-responsive and translating devices, and means preventing the transmission of vehicle carried energy when two or more vehicles occupy the same block.

13. A continuous indication train controlling system comprising a track divided into block sections, each consisting of a short preliminary section and a main section, a closed track circuit including a track relay for each section, a third rail parallel to the track divided into corresponding block sections, an electro-responsive device for each block section, an energizing circuit for each device controlled by the track relays of the respective block, a retaining circuit for each device including a front contact of the respective preliminary track relay, a back contact of the main track relay and a contact which is closed only when the device is energized, means controlled by the electro-responsive devices for supplying signalling energy to the conductor sections, a connection between each conductor section and the track rail of a preceding block including a front contact of the associated electro-responsive device, a vehicle travelling on said track provided with a contact engaging said conductor, a relay on said vehicle connected to the contact thereof and responsive to said signalling energy, a source of energy on said vehicle of a different character from said signaling energy connected to said contact shoe, an electro-responsive device on said vehicle responsive to energy flowing through the track rails from a vehicle carried source, and train controlling devices governed by said translating device and said relay.

14. In a continuous indication train controlling system, a track divided into block sections, sources of current and track relays connected to said sections, a conductor parallel to the track divided into corresponding sections, means controlled by the track relays for supplying signaling energy to the conductor sections and for connecting each conductor section with a track rail of the preceding block, vehicles travelling on said track each having a contact engaging said conductor and an electro-responsive device connected to said contact and responsive to said signalling energy, a source of energy carried by each vehicle of a different character from said signalling energy, a translating device on each vehicle responsive to energy flowing through the track rails from a vehicle carried source, and train controlling devices governed by said electro-responsive and translating devices.

EDWARD C. SASNETT.